US008793528B2

(12) United States Patent
Sivaramakrishnan et al.

(10) Patent No.: US 8,793,528 B2
(45) Date of Patent: Jul. 29, 2014

(54) DYNAMIC HYPERVISOR RELOCATION

(75) Inventors: Ramaswamy Sivaramakrishnan, San Jose, CA (US); Jiejun Lu, Sunnyvale, CA (US); Aaron S. Wynn, San Jose, CA (US)

(73) Assignee: Oracle International Corporation, Redwood City, CA (US)

( * ) Notice: Subject to any disclaimer, the term of this patent is extended or adjusted under 35 U.S.C. 154(b) by 317 days.

(21) Appl. No.: 13/308,372

(22) Filed: Nov. 30, 2011

(65) Prior Publication Data
US 2013/0138995 A1 May 30, 2013

(51) Int. Cl.
*G06F 11/00* (2006.01)
(52) U.S. Cl.
USPC ............................. 714/4.11; 714/4.1; 714/11
(58) Field of Classification Search
USPC .............. 714/4.1, 4.11, 4.2, 11, 25, 43, 47.1
See application file for complete search history.

(56) References Cited

U.S. PATENT DOCUMENTS

| 2010/0250824 | A1* | 9/2010 | Belay | 711/6 |
| 2011/0191627 | A1* | 8/2011 | Koning et al. | 714/10 |
| 2012/0131576 | A1* | 5/2012 | Hatta et al. | 718/1 |
| 2013/0054807 | A1* | 2/2013 | Sherwood et al. | 709/226 |
| 2013/0086298 | A1* | 4/2013 | Alanis et al. | 711/6 |

* cited by examiner

*Primary Examiner* — Joseph D Manoskey
(74) *Attorney, Agent, or Firm* — Osha Liang LLP

(57) ABSTRACT

A method for managing multiple nodes hosting multiple memory segments, including: identifying a failure of a first node hosting a first memory segment storing a hypervisor; identifying a second memory segment storing a shadow of the hypervisor and hosted by a second node; intercepting, after the failure, a hypervisor access request (HAR) generated by a core of a third node and comprising a physical memory address comprising multiple node identification (ID) bits identifying the first node; modifying the multiple node ID bits of the physical memory address to identify the second node; and accessing a location in the shadow of the hypervisor specified by the physical address of the HAR after the multiple node ID bits are modified.

19 Claims, 5 Drawing Sheets

DYNAMIC HYPERVISOR RELOCATION

BACKGROUND

A hypervisor is a hardware virtualization technique that allows multiple operating systems to run concurrently on a system. The hypervisor presents to the guest operating systems a virtual operating platform and manages the execution of the guest operating systems. During execution, the guest operating systems may issue hypervisor access requests (HARs) to read from and/or write to various locations in hypervisor memory. As the guest operating systems are heavily dependent on the hypervisor, it is difficult to remove the node having the hypervisor from the pool of nodes in the system.

SUMMARY OF INVENTION

In general, in one aspect, the invention relates to a method for managing a plurality of nodes hosting a plurality of memory segments. A method comprises: identifying a failure of a first node hosting a first memory segment storing a hypervisor; identifying a second memory segment storing a shadow of the hypervisor and hosted by a second node; intercepting, after the failure, a hypervisor access request (HAR) generated by a core of a third node and comprising a physical memory address comprising a plurality of node identification (ID) bits identifying the first node; modifying the plurality of node ID bits of the physical memory address to identify the second node; and accessing a location in the shadow of the hypervisor specified by the physical address of the HAR after the plurality of node ID bits are modified.

In general, in one aspect, the invention relates to system for managing a plurality of nodes hosting a plurality of memory segments. A system comprises: a first node hosting a first memory segment storing a hypervisor; a second node operatively connected to the first node and hosting a second memory segment storing a shadow of the hypervisor; and a third node comprising a core comprising: a hypervisor access request (HAR) comprising a plurality of node identification (ID) bits identifying the first node; and a cache controller configured to modify the plurality of node ID bits to identify the second node after a failure of the first node.

Other aspects of the invention will be apparent from the following description and the appended claims.

DETAILED DESCRIPTION

Figure 1:
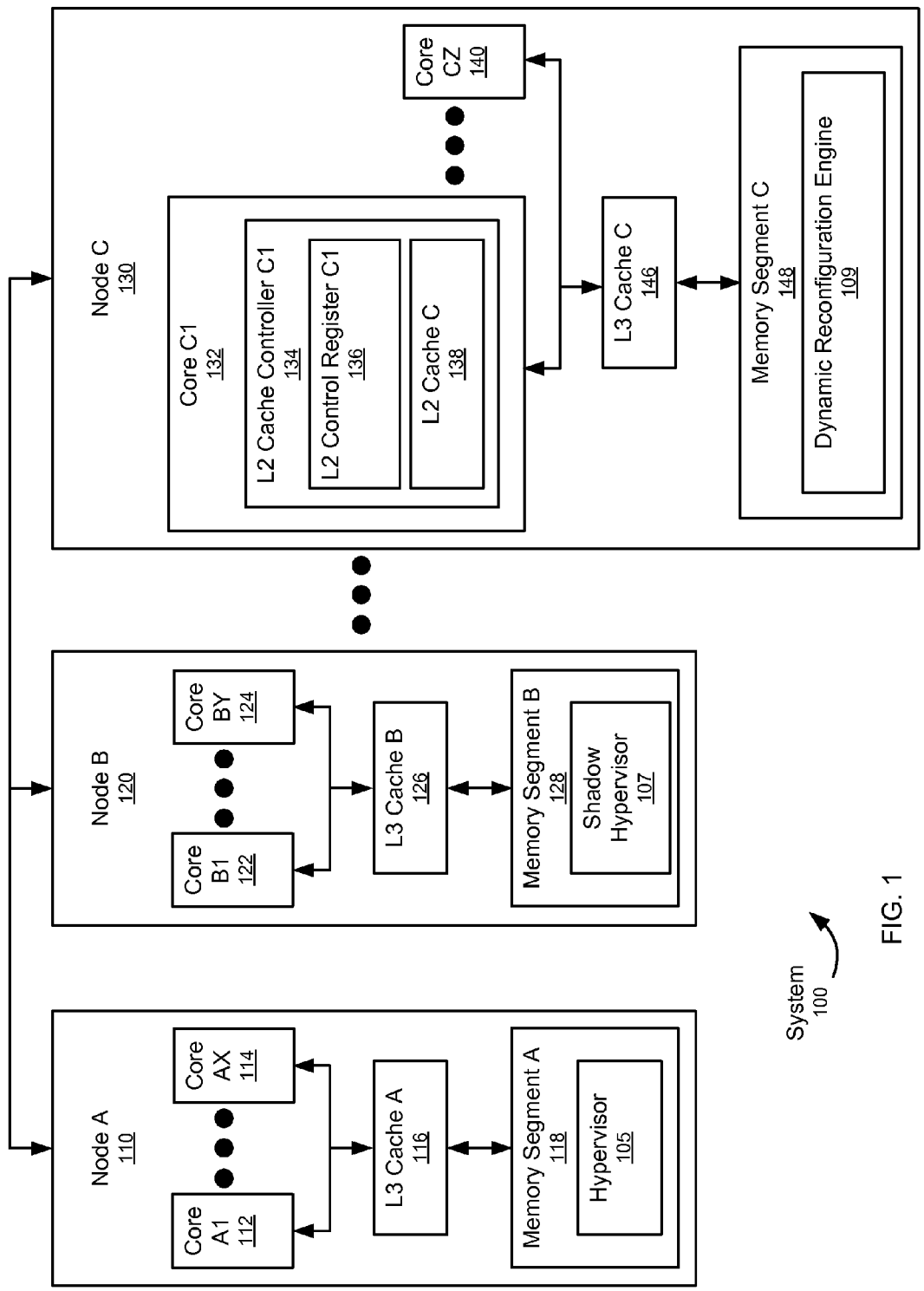
FIG. 1 shows a block diagram depicting a system in accordance in with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for managing multiple nodes hosting multiple memory segments. Specifically, one node (e.g., Node X) in a pool of nodes hosts a memory segment storing a hypervisor, while another node (e.g., Node Y) in the pool hosts another memory segment storing a shadow of the hypervisor (i.e., a shadow hypervisor or mirror hypervisor). Once a failure of Node X is identified, the control registers in the cores of the remaining nodes (i.e., all nodes in the pool except Node X) are set to enable remapping. As a result of enabling remapping, any subsequent hypervisor access request generated by a core is intercepted and modified to identify Node Y instead of Node X.

FIG. 1 shows a system (100) in accordance with one or more embodiments of the invention. As shown in FIG. 1, the system (100) includes multiple nodes (i.e., Node A (110), Node B (120), Node C (130)) having multiple components. Specifically, each node includes one or more processor cores (i.e., Core A1 (112), Core AX (114), Core B1 (122), Core BY (124), Core C1 (132), Core CZ (140)) operatively connected to one or more L3 Caches (i.e., L3 Cache A (116), L3 Cache B (126), L3 Cache C (146)). As also shown in FIG. 1, each node (110, 120, 130) hosts a memory segment (i.e., a physical address space). Specifically, Node A (110) hosts Memory Segment A (118), Node B (120) hosts Memory Segment B (128), and Node C (130) hosts Memory Segment C (148).

In one or more embodiments of the invention, Memory Segment A (118) stores the Hypervisor (105). The Hypervisor (105) is a hardware virtualization technique that allows multiple operating systems to run concurrently on one or more of the cores (112, 114, 122, 124, 132, 140) of the system (100). The Hypervisor (105) presents to the guest operating systems a virtual operating platform and manages the execution of the guest operating systems. In one or more embodiments of the invention, the Hypervisor (105) executes directly on the hardware of the system (100) to control the hardware and to manage guest operating systems. Accordingly, the Hypervisor (105) may be classified as a native or bare metal hypervisor. In one or more embodiments of the invention, Memory Segment B (128) stores the Shadow Hypervisor (107). The Shadow Hypervisor (107) is a mirror (i.e., copy) of the Hypervisor (105).

In one or more embodiments of the invention, each core (112, 114, 122, 124, 132, 140) includes an L2 Cache controller having an L2 Cache and an L2 control register. For example, Core C1 (132) includes L2 Cache Controller C1 (134) having L2 Cache C (138) and L2 Control Register C1 (136). As discussed above, the multiple cores (112, 114, 122, 124, 132, 140) may be executing multiple guest operating systems using the Hypervisor (105). Accordingly, each core (112, 114, 122, 124, 132, 140) may generate hypervisor access requests (HARs) to access (i.e., read from and/or write to) locations in the Hypervisor (105). Those skilled in the art, having the benefits of this detailed description, will appreciate that the HARs generated by the cores (112, 114, 122, 124, 132, 140) may identify Node A (110) because Node A (110) is hosting Memory Segment A (118) storing the Hypervisor (105).

In one or more embodiments of the invention, when a node is offlined, the memory segment hosted by the node is no longer accessible. For example, if Node A (110) is offlined (e.g., in response to a failure of Node A (110)), Memory Segment A (118) and the Hypervisor (105) are no longer accessible to the remaining nodes (i.e., Node B (120), Node C (130)). In one or more embodiments of the invention, when Node A (110) is offlined, each L2 Cache controller is configured to intercept a HAR generated by its corresponding core, and modify the HAR to identify Node B (120) (i.e., the node hosting the memory segment storing the Shadow Hypervisor (107)) instead of Node A (110). In other words, as the Shadow Hypervisor (107) is a mirror (i.e., copy) of the Hypervisor (105), the HARs may be redirected to Node B (120) upon the failure of Node A (110). In other words, the L2 Cache controllers are configured to implement a remapping feature that includes intercepting and modifying the HAR. The modification of the HAR may be based on the bits of the L2 control register in the core (e.g., L2 Control Register C1 (136)) (discussed below).

Figure 2:
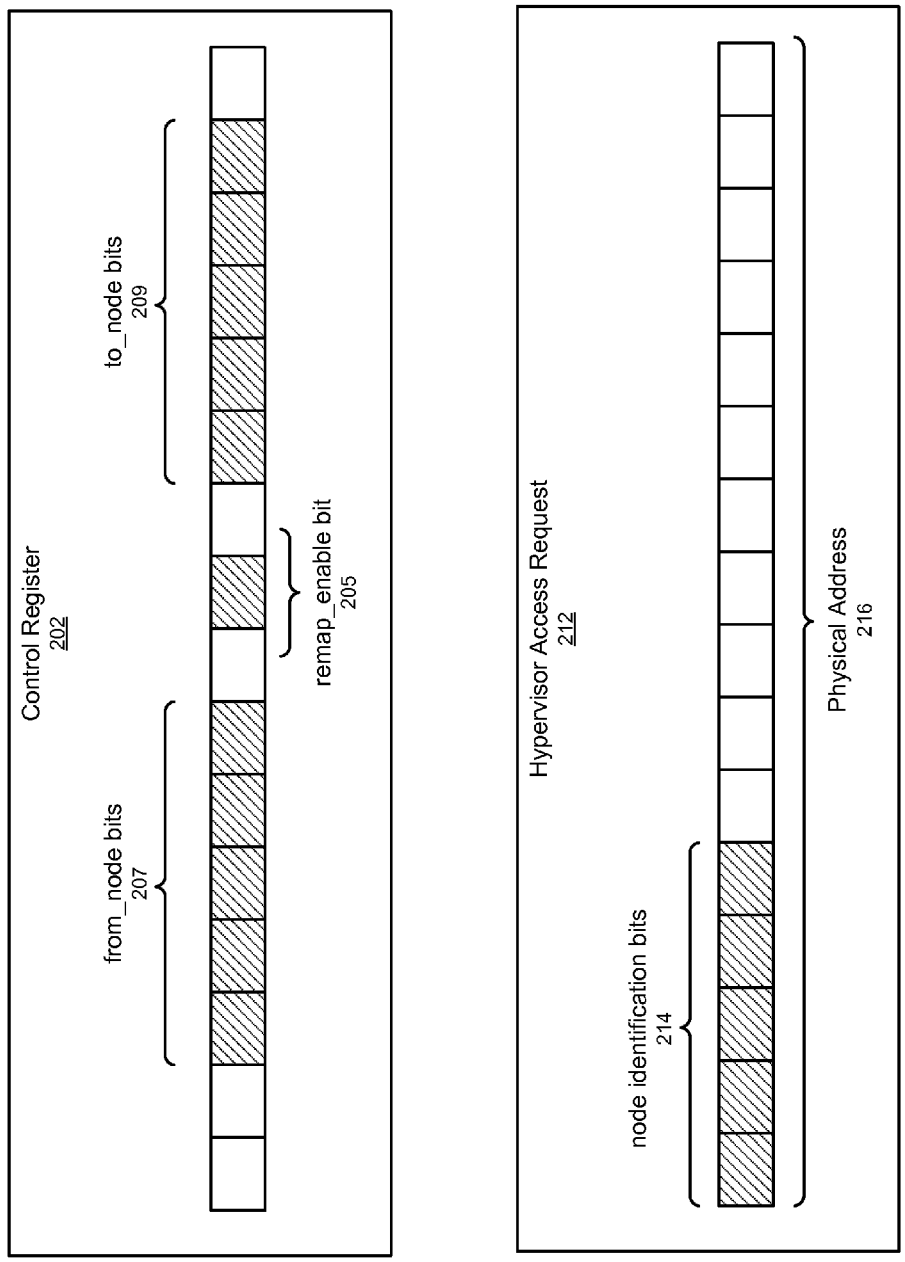
FIG. 2 shows a block diagram depicting a control register and a hypervisor access request (HAR) in accordance with one or more embodiments of the invention.

FIG. 2 shows a HAR (212) in accordance with one or more embodiments of the invention. The HAR (212) may be generated by any of the cores (112, 114, 122, 124, 132, 140) discussed above in reference to FIG. 1. As shown in FIG. 2, the HAR (212) includes a physical address (216) having multiple bits. As also shown in FIG. 2, the physical address (216) includes multiple node identification (ID) bits (214). Although only 5 node ID bits are shown, the physical address may have any number of node ID bits including 8 node ID bits (i.e., the node ID bits may have a cardinality of eight—a byte). Moreover, the node ID bits (214) may correspond to bits [46:39] of the physical address (216).

In one or more embodiments of the invention, the node ID bits (214) specify the target/destination node for the HAR (212). In other words, the target/destination node may be decoded from the node ID bits (214). Accordingly, in view of FIG. 1, the node ID bits (214) may identify Node A (110) when the HAR (212) is first generated by a core. However, as discussed above, when Node A (110) is offlined and the Hypervisor (105) is no longer accessible, the HAR (212) may be intercepted and modified to identify Node B (120) having the Shadow Hypervisor (107). The physical address (216) may also include a pointer to specify the location within the Hypervisor (105). As the pointer is independent of the node ID bits (214), there is no need to change the pointer if the node ID bits (214) are modified.

FIG. 2 also shows a Control Register (202) in accordance with one or more embodiments of the invention. The Control Register (202) may correspond to L2 Control Register C1 (136), discussed above in reference to FIG. 1. As shown in FIG. 2, the Control Register (202) includes multiple from_node bits (207), multiple to_node bits (209), and at least one remap_enable bit (205). Although only 5 from_node bits (207) and 5 to_node bits (209) are shown, there may be any number of from_node bits (207) and to_node bits (209).

In one or more embodiments of the invention, the from_node bits (207) identify the node hosting the memory segment storing the hypervisor (e.g., Node A (110), discussed above in reference to FIG. 1). In other words, Node A (110) may be decoded from the from_node bits (207). In one or more embodiments of the invention, the to_node bits (209) identify the node hosting the memory segment storing the shadow hypervisor (e.g., Node B (120), discussed above in reference to FIG. 1). In other words, Node B (120) may be decoded from the to_node bits (209). The remap_enable bit (205) specifies whether intercepting and modifying HARs is enabled. For example, if remap_enable bit (205)=1, any generated HAR will be intercepted and modified to identify Node B (120) instead of Node A (110). However, if remap_enable bit (205)=0, any generated HAR will not be intercepted and thus not modified.

The from_node bits (207) and the to_node bits (209) may be set at any time. For example, the from_node bits (207) and/or the to_node bits (209) may be set upon initialization of the system (100). As another example, the from_node bits (207) and/or the to_node bits (209) may be set after a failure of Node A (110) is identified. The remap_enable bit (205) may be set after a failure of Node A (110) is identified.

As discussed above, the Control Register (202) may correspond to L2 Control Register C1 (136), and the HAR (212) may be generated by Core C1 (132). In one or more embodiments of the invention, when the remapping feature (i.e., intercepting and modifying HARs) is enabled (i.e., remap_enable bit (205)=1), the node ID bits (214) of the generated HAR (212) are compared (e.g., by L2 Cache Controller C1 (134)) with the from_node bits (207) of the Control Register (202). In the event there is a match (i.e., from_node bits (207)=node ID bits (214)), the HAR (212) is modified by setting the node ID bits (214) to the to_node bits (209). Accordingly, the modified HAR (212) will identify Node B (120) instead of Node A (110).

Referring back to FIG. 1, the system (100) includes a dynamic reconfiguration (DR) engine (109). The DR engine (109) may be stored on Memory Segment C (148). Alternatively, the DR engine (109) may be stored on Memory Segment B (128) with the Shadow Hypervisor (107). In one or more embodiments of the invention, the DR engine (109) is a software application configured to identify a failure of Node A (110); quiesce the Hypervisor (105); offline Node A (110) and remove Node A (110) from the pool of nodes; and set the remap_enable bit(s) of the L2 control registers in the remaining nodes, effectively activating the remapping feature (i.e., interception and modification of HARs). The DR engine (109) is also configured to set the from_node bits (207) and the to_node bits (209) of each L2 control register in the nodes at any time.

Although many caches, cache controllers, and control registers in the system (100) have been described as L2 Caches, L2 Cache controllers, and L2 control registers, respectively, those skilled in the art, having the benefit of this detailed description, will appreciate that any cache level and/or cache hierarchy may be used to implement one or more of the described features and functionality.

Figure 3:
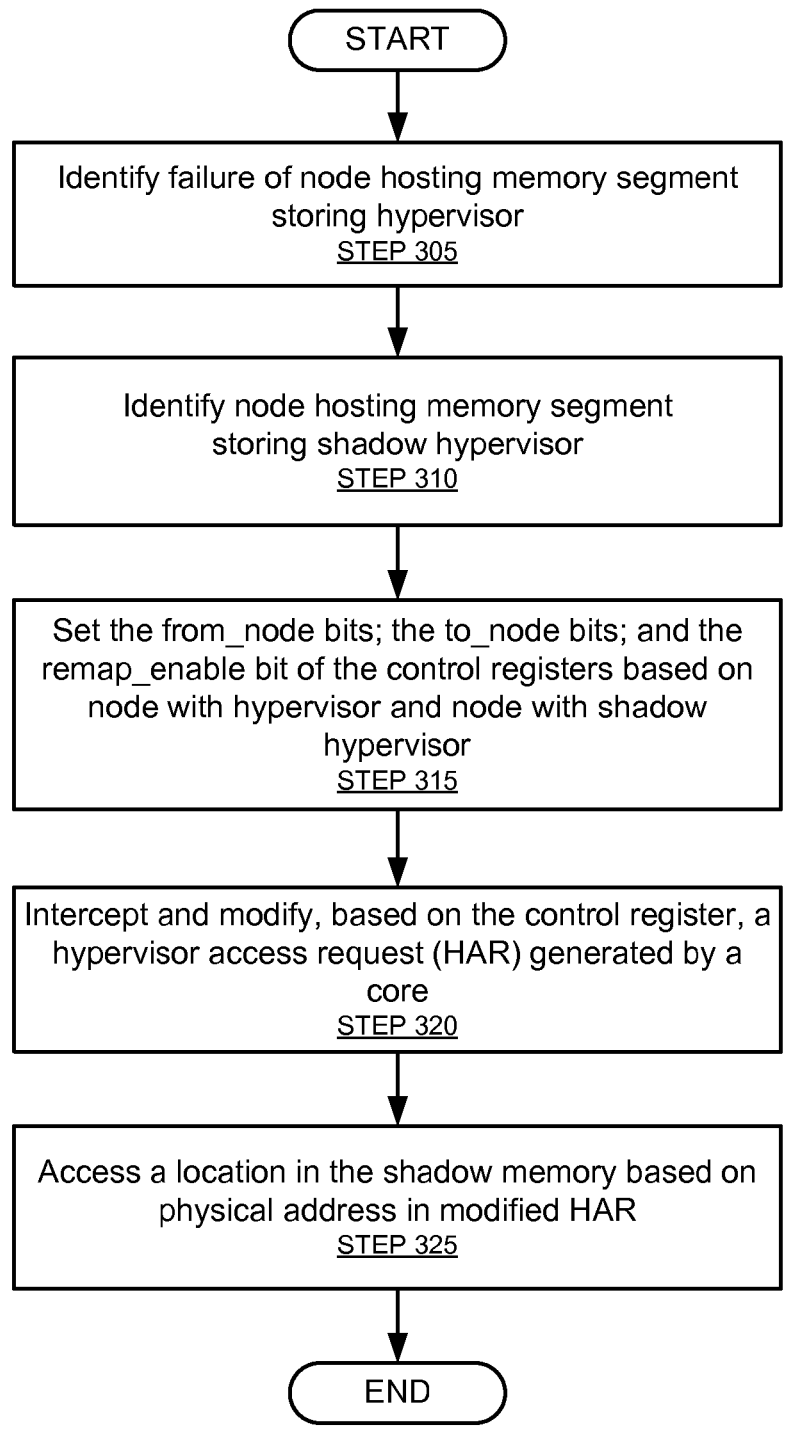
FIG. 3 shows a flowchart in accordance with one or more embodiments of the invention.

FIG. 3 shows a flowchart in accordance with one or more embodiments of the invention. The process depicted in FIG. 3 may be implemented using one or more of the components of system (100), discussed above in reference to FIG. 1 and FIG. 2. One or more steps shown in FIG. 3 may be omitted, repeated, and/or performed in a different order among different embodiments of the invention. Accordingly, embodiments of the invention should not be considered limited to the specific number and arrangement of steps shown in FIG. 3.

Initially, a failure of a node hosting a memory segment storing a hypervisor is identified (STEP 305). As discussed above, the hypervisor is a hardware virtualization technique that allows multiple operating systems to run concurrently on a system (e.g., system (100), discussed above in reference to FIG. 1). The hypervisor presents to the guest operating systems a virtual operating platform and manages the execution of the guest operating systems. As also discussed above, each memory segment is a physical address space accessible to the nodes of the system. In response to the failure, the hypervisor is quiesced and the node is removed from the system. Upon removing the node from the system, the memory segment hosted by the node, including the hypervisor, is no longer accessible to the remaining nodes in the system.

In STEP 310, a node hosting a memory segment storing a shadow hypervisor is identified. The shadow hypervisor is a mirror (i.e., a copy) of the hypervisor. In one or more embodiments of the invention, the node with the shadow hypervisor is identified after the failure of the node with the hypervisor is identified. Alternatively, the node with the shadow hypervisor may be identified at any time. The node with the shadow hypervisor may be identified by the DR engine (109), discussed above in reference to FIG. 1. The DR engine (109) may be stored in the same memory segment as the shadow hypervisor. Alternatively, the DR engine (109) may be stored on any memory segment within the system.

In STEP 315, multiple bits in the control registers of the remaining nodes are set. Specifically, the from_node bits are set to identify the node with the hypervisor and the to_node bits are set to identify the node with the shadow hypervisor. The from_node bits and/or the to_node bits may be set after the failure of the node with the hypervisor is identified. Alternatively, the from_node bits and/or the to_node bits may be set at any time. Moreover, the remap_enable bit(s) of each control register in the remaining nodes is set to activate the remapping feature. The remap_enable bit(s) may be set (i.e., programmed) in response to identifying the failure of the node with the hypervisor.

As discussed above, a HAR may be generated by software (e.g., guest operating system) executing on a core. As also discussed above, the HAR includes a physical address having multiple node ID bits. The node ID bits specify the destination/target node of the HAR.

In STEP 320, the HAR is intercepted (i.e., prevented from being sent from the core) in response to the enabled remapping feature and the physical address of the HAR matching the from_node bits of the control register in the core. In other words, the from_node bits are read from the control register in the core and compared with the node ID bits in the physical address of the HAR to establish the match. Moreover, the HAR is modified by setting the node ID bits to the to_node bits in the control register. In one or more embodiments of the invention, the comparing and modifying are performed by the hardware cache controller. Those skilled in the art, having the benefit of this detailed description, will appreciate that by modifying the physical address of the HAR, the HAR will be directed towards the shadow hypervisor instead of the hypervisor. In addition, as only node ID bits are being modified, the pointer(s) in the physical address remain unchanged.

In STEP 325, the modified HAR is issued from the core. The modified HAR is received by the shadow hypervisor, and the location in the shadow hypervisor identified by the physical address (e.g., pointer in the physical address) is accessed.

Figure 4:
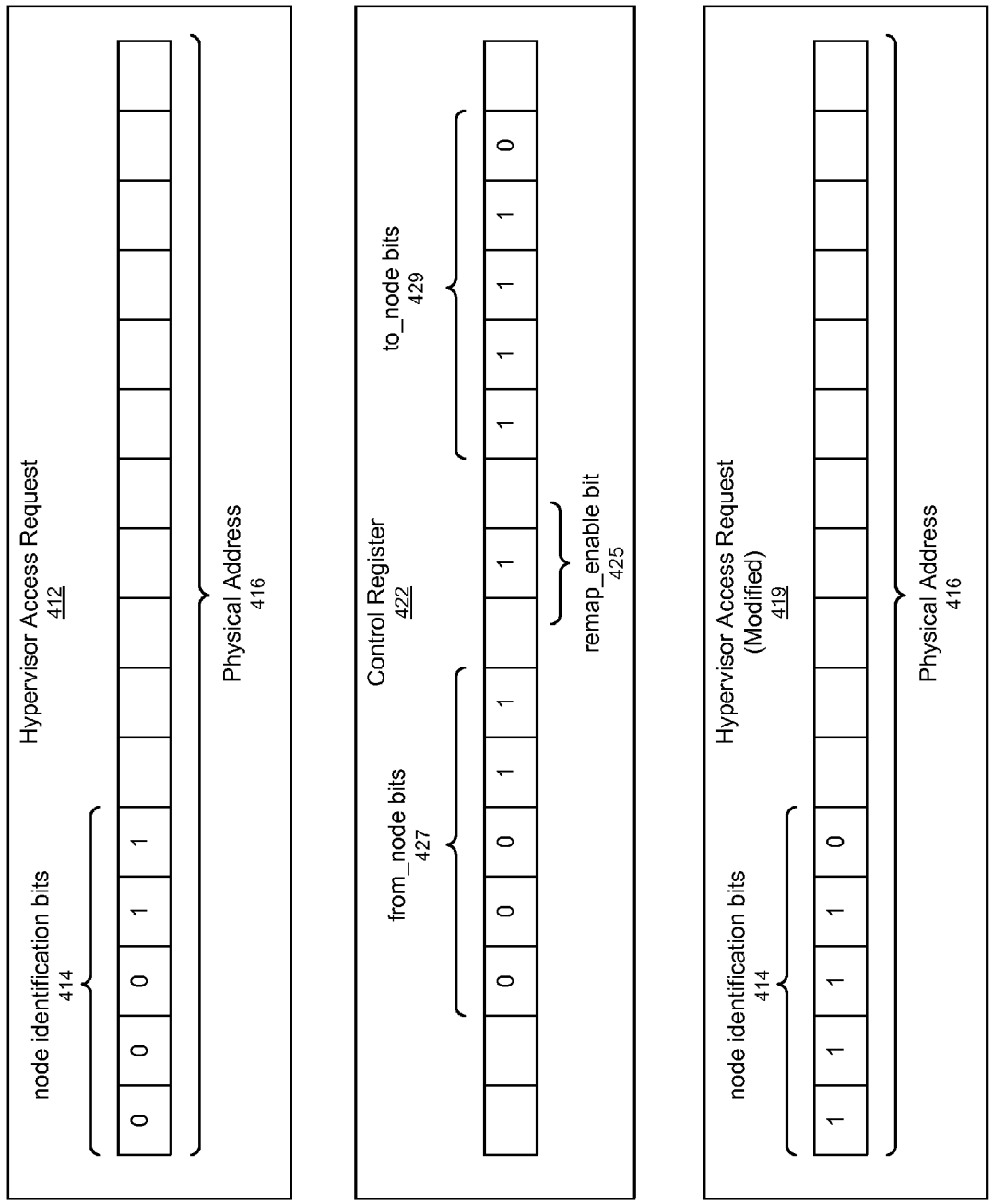
FIG. 4 shows an example in accordance with one or more embodiments of the invention.

FIG. 4 shows an example in accordance with one or more embodiments of the invention. As shown in FIG. 4, there exists a control register (422) having multiple from_node bits (427), multiple to_node bits (429), and at least one remap_enable bit (425). The control register (422) is located in a core of a node. The from_node bits (427) (i.e., 00011) identify a node in the system having the hypervisor. The to_node bits (429) (i.e., 11110) identify a different node in the system having the shadow hypervisor (i.e., a copy of the hypervisor). In this example, assume a failure of the node having the hypervisor (i.e., the node identified by node ID bits 00011) has occurred. Accordingly, the node has been removed and the memory segment (i.e., physical memory space) hosted by the node, including the hypervisor, is no longer accessible to the remaining nodes in the pool. The from_node bits (427) and the to_node bits (429) were set prior to identifying the failure of the node having the hypervisor. However, the remap_enable bit (425) was set (i.e., remap_enable bit (425)=1) in response to identifying the failure of the node having the hypervisor.

As also shown in FIG. 4, there exists a HAR (412) having a physical address (416) with multiple node ID bits (414). The HAR (412) is generated by a guest operating system executing on a core having the control register. The node ID bits (414) (i.e., 00011) identify the node having the hypervisor needed to execute the guest operating system. In this example, assume the HAR (412) was generated after the remap_enable bit (425) was set (i.e., after the failure of the node with the hypervisor).

In response to (i) the remap_enable bit (425) being set; and (ii) the node ID bits (414) of the HAR (412) matching the from_node bits (427) of the Control Register (422), the HAR (412) is intercepted and modified. FIG. 4 also shows the modified HAR (419). As shown in FIG. 4, the node ID bits (414) of the modified HAR (419) are set to the to_node bits (429) of the Control Register (422). Those skilled in the art, having the benefit of this detailed description, will appreciate that by modifying the physical address (416), specifically the node ID bits (414) of the HAR (412), the modified HAR (419) will be directed towards the shadow hypervisor instead of the hypervisor.

One or more embodiments of the invention have one or more of the following advantages: the ability to redirect HARs to a different memory space storing the shadow hypervisor without altering the source code for the hypervisor; the ability to offline any node regardless of whether it hosts the memory segment storing the hypervisor; the ability to remove the node with the hypervisor without changing the pointers in the HARs generated by the guest operating systems; the ability to make the transition from the hypervisor to the shadow hypervisor transparent to the guest operating systems; etc.

Figure 5:
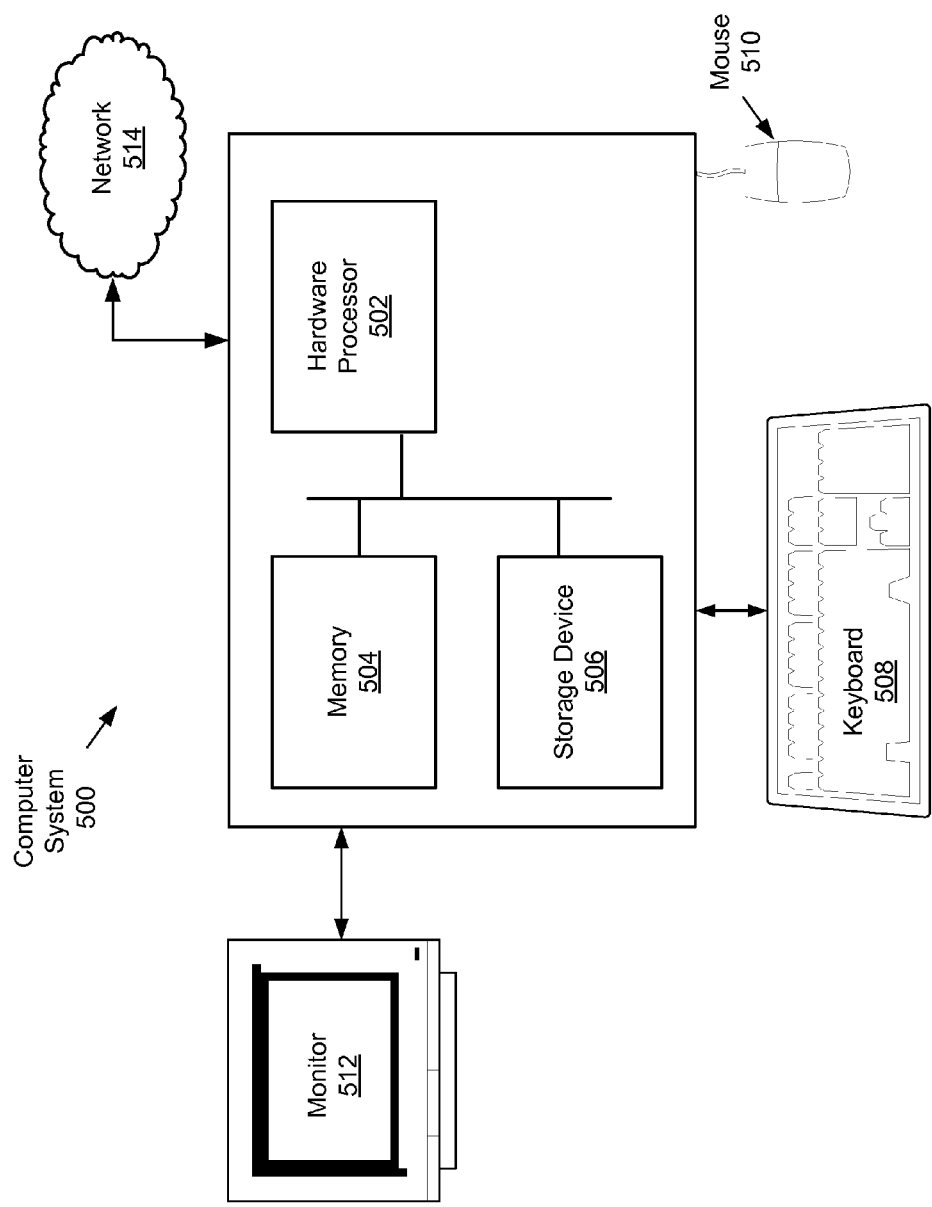
FIG. 5 shows a computer system in accordance with one or more embodiments of the invention.

Embodiments of the invention may be implemented on virtually any type of computer regardless of the platform being used. For example, as shown in FIG. 5, a computer system (500) includes one or more hardware processor(s) (502) (such as a central processing unit (CPU), integrated circuit, etc.), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer system (500) may also include input means, such as a keyboard (508), a mouse (510), or a microphone (not shown). Further, the computer system (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN), the Internet, or any other type of network) via a network interface connection (not shown). Those skilled in the art will appreciate that many different types of computer systems exist, and the aforementioned input and output means may take other forms, now known or later developed. Generally speaking, the computer system (500) includes at least the minimal processing, input, and/or output means necessary to practice embodiments of the invention.

Further, in one or more embodiments of the invention, one or more elements of the aforementioned computer system (500) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, a hard drive, punch cards, memory, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing a plurality of nodes hosting a plurality of memory segments, comprising:
    identifying a failure of a first node hosting a first memory segment storing a hypervisor;
    identifying a second memory segment storing a shadow of the hypervisor and hosted by a second node;
    intercepting, by a cache controller and after the failure, a hypervisor access request (HAR) generated by a core of a third node and comprising a physical memory address comprising a plurality of node identification (ID) bits identifying the first node;
    modifying, by the cache controller, the plurality of node ID bits of the physical memory address to identify the second node; and
    accessing a location in the shadow of the hypervisor specified by the physical address of the HAR after the plurality of node ID bits are modified.

2. The method of claim 1, further comprising:
    quiescing, by a dynamic reconfiguration (DR) engine, the hypervisor in response to the failure; and
    removing the first node from the plurality of nodes.

3. The method of claim 2, wherein the DR engine is stored in a third memory segment hosted by the third node.

4. The method of claim 2, wherein the DR engine is stored in the second memory segment hosted by the second node.

5. The method of claim 1, wherein the cache controller is an L2 controller.

6. The method of claim 1, further comprising:
    setting a plurality of from_node bits in a control register of the cache controller to identify the first node;
    setting a plurality of to_node bits in the control register to identify the second node; and
    setting, after identifying the failure, a remap_enable bit in the control register of the cache controller, wherein intercepting the HAR is based on the remap_enable bit.

7. The method of claim 6, further comprising:
    generating a comparison by comparing the plurality of node ID bits of the physical memory address to the plurality of from_node bits in the control register,
    wherein modifying the plurality of node ID bits of the physical memory address comprises setting, based on the comparison, the plurality of node ID bits to the plurality of to_node bits.

8. The method of claim 1, wherein the core executes a guest operating system using the hypervisor.

9. The method of claim 1, wherein the plurality of destination bits are bits [46:39] of the physical address.

10. A system comprising:
    a first node hosting a first memory segment storing a hypervisor;
    a second node operatively connected to the first node and hosting a second memory segment storing a shadow of the hypervisor; and
    a third node comprising a core comprising:
        a hypervisor access request (HAR) comprising a plurality of node identification (ID) bits identifying the first node; and
        a cache controller configured to modify the plurality of node ID bits to identify the second node after a failure of the first node.

11. The system of claim 10, further comprising a third memory segment storing a dynamic reconfiguration (DR) engine configured to:
    identify the failure of the first node;
    quiesce the hypervisor in response to identifying the failure; and
    remove the first node from the plurality of nodes.

12. The system of claim 11, wherein the third node hosts the third memory segment.

13. The system of claim 10, wherein the cache controller is an L2 controller.

14. The system of claim 10, wherein the core further comprises:
    a control register comprising a remap_enable bit, a plurality of from_node bits identifying the first node, and a plurality of to_node bits identifying the second node.

15. The system of claim 14, wherein the remap_enable bit, the plurality of from_node bits, and the plurality of to_node bits are set by the DR engine in response to the failure.

16. The system of claim 14, wherein the cache controller is further configured to generate a comparison by comparing the plurality of node ID bits in the physical address with the plurality of from_node bits in the control register, and wherein the control register modifies the plurality of node ID bits, based on the comparison, by setting the plurality of node ID bits to the plurality of to_node bits in the control register.

17. The system of claim 10, wherein the core executes a guest operating system using the hypervisor.

18. The system of claim 10, wherein the plurality of node ID bits are bits [46:39] of the physical address.

19. The system of claim of claim 10, wherein the plurality of node ID bits has a cardinality of 8.

* * * * *